US012811402B2

(12) United States Patent
Wyma

(10) Patent No.: US 12,811,402 B2
(45) Date of Patent: Nov. 24, 2026

(54) LOAD BALANCING

(71) Applicant: ENATEL, Christchurch (NZ)

(72) Inventor: Murray Raymond Wyma, Christchurch (NZ)

(73) Assignee: Enatel, Christchurch (NZ)

( * ) Notice: Subject to any disclaimer, the term of this patent is extended or adjusted under 35 U.S.C. 154(b) by 294 days.

(21) Appl. No.: 17/469,563

(22) Filed: Sep. 8, 2021

(65) Prior Publication Data

US 2021/0408795 A1 Dec. 30, 2021

Related U.S. Application Data

(63) Continuation of application No. 16/941,189, filed on Jul. 28, 2020, now abandoned, which is a (Continued)

(30) Foreign Application Priority Data

Sep. 25, 2014 (NZ) ........................................ 700418

(51) Int. Cl.
*H02J 3/32* (2026.01)
*H02J 3/02* (2006.01)
(Continued)

(52) U.S. Cl.
CPC .................. *H02J 3/32* (2013.01); *H02J 3/02* (2013.01); *H02J 3/12* (2013.01); *H02J 3/26* (2013.01); *Y02E 40/50* (2013.01)

(58) Field of Classification Search
CPC ........................................................ H02J 3/32
See application file for complete search history.

(56) References Cited

U.S. PATENT DOCUMENTS 5,321,600 A 6/1994 Fierheller
5,406,470 A * 4/1995 Ridley .................. H02M 3/285 363/69

(Continued)

FOREIGN PATENT DOCUMENTS

DE 69633073 T2 7/2005

OTHER PUBLICATIONS

International Search Report (Form PCT/ISA/210) for International Application No. PCT/NZ2015/050164 mailed Mar. 31, 2016, 4 pages.

(Continued)

*Primary Examiner* — Daniel Kessie
(74) *Attorney, Agent, or Firm* — Greenberg Traugir, LLP

(57) ABSTRACT

A load balancing apparatus balances the current supplied on each phase of a multiple phase supply, wherein each supply phase feeds an AC load, as well as an AC-DC converter. The apparatus measures the current supplied from each phase of the supply as well as the power consumed by each of the AC loads. The power consumed by each of the AC-DC converters is adjusted so that the sum of the current drawn by any one of the AC loads, plus the current drawn by the AC-DC converter on the same supply phase, is substantially balanced between the supply phases. Typically, the AC-DC converters supply a common DC bus, such as a battery. In some examples, each AC load includes a DC-AC converter configured to supply power from the common DC battery to one or more of the AC loads.

18 Claims, 4 Drawing Sheets

Related U.S. Application Data continuation of application No. 15/513,840, filed as application No. PCT/NZ2015/050164 on Sep. 25, 2015, now Pat. No. 10,763,672.

(51) Int. Cl.
*H02J 3/12* (2006.01)
*H02J 3/26* (2006.01)

(56) References Cited

U.S. PATENT DOCUMENTS

| | | | | |
|---|---|---|---|---|
| 5,604,385 | A | 2/1997 | David | |
| 5,754,445 | A | 5/1998 | Jouper | |
| 9,229,514 | B2 | 1/2016 | Humphrey | |
| 9,489,003 | B1 * | 11/2016 | O Sullivan | G05F 1/66 |
| 9,796,278 | B2 | 10/2017 | Zaki | |
| 9,865,410 | B2 | 1/2018 | Mousavi | |
| 9,935,491 | B2 | 4/2018 | Yang | |
| 9,997,916 | B2 | 6/2018 | Fluman | |
| 10,763,672 | B2 | 9/2020 | Wyma | |
| 2004/0257271 | A1 * | 12/2004 | Jacobson | G01S 7/282 342/175 |
| 2006/0012931 | A1 | 1/2006 | Engel et al. | |
| 2007/0081281 | A1 | 4/2007 | Hamer | |
| 2008/0197706 | A1 | 8/2008 | Nielsen | |
| 2008/0315685 | A1 * | 12/2008 | Mandalakas | H02J 3/1842 307/45 |
| 2009/0244945 | A1 | 10/2009 | Hatanaka | |
| 2010/0276998 | A1 | 11/2010 | Luo et al. | |
| 2011/0118894 | A1 | 5/2011 | Reineccius et al. | |
| 2012/0068540 | A1 | 3/2012 | Luo | |
| 2012/0175951 | A1 | 7/2012 | Pamulaparthy | |
| 2013/0286697 | A1 | 10/2013 | Eiland | |
| 2014/0236369 | A1 | 8/2014 | Keams et al. | |
| 2015/0084434 | A1 | 3/2015 | Mousavi | |
| 2015/0183329 | A1 | 7/2015 | Nakaya | |
| 2015/0328999 | A1 * | 11/2015 | Dureau | B60L 50/51 320/109 |
| 2015/0365007 | A1 | 12/2015 | Kaukojarvi | |
| 2020/0358291 | A1 | 11/2020 | Wyma | |

OTHER PUBLICATIONS

International Preliminary Report on Patentability (Forms PCT/IB/373 and PCT/ISA/237) for International Application No. PCT/NZ2015/050164 mailed Mar. 28, 2017, 5 pages.
First Examination Report for New Zealand Patent Application No. 700418 dated Aug. 25, 2015, 4 pages.
Further Examination Report for New Zealand Patent Application No. 700418 dated Apr. 22, 2016, 3 pages.
Examination Report No. 1 for Australian Patent Application No. 2015322204 dated May 7, 2019, 5 pages.
Examination Report No. 2 for Australian Patent Application No. 2015322204 dated May 7, 2020, 5 pages.
Examination Report No. 1 for Australian Patent Application No. 2020203025 dated Jul. 14, 2021, 6 pages.
Non-Final Office Action for U.S. Appl. No. 15/513,840, mailed Apr. 11, 2019, 10 pages.
Final Office Action for U.S. Appl. No. 15/513,840, mailed Nov. 21, 2019, 12 pages.
Notice of Allowance for U.S. Appl. No. 15/513,840, mailed Apr. 30, 2020, 8 pages.
Notice of Allowance for U.S. Appl. No. 16/941,189, mailed Jun. 17, 2021, 7 pages.
Non-Final Office Action for U.S. Appl. No. 16/941,189, mailed Mar. 1, 2022, 8 pages.
Final Office Action for U.S. Appl. No. 16/941,189, mailed Aug. 23, 2022, 9 pages.

* cited by examiner

LOAD BALANCING

CROSS REFERENCE TO RELATED APPLICATIONS

This application is a continuation of U.S. patent application Ser. No. 16/941,189 filed on Jul. 28, 2020, which is a continuation of U.S. patent application Ser. No. 15/513,840 filed on Mar. 23, 2017, now U.S. Pat. No. 10,763,672, which is the U.S. national phase under 35 U.S.C. § 371 of International Application No. PCT/NZ2015/050164 filed on Sep. 25, 2015, which claims priority to New Zealand Patent Application No. 700418, filed on Sep. 25, 2014, wherein each of the foregoing applications and patents is hereby incorporated reference herein in its entirety.

TECHNICAL FIELD

The present disclosure relates to improvements in and relating to load balancing. In particular, the present disclosure relates to load balancing a 3-phase power supply.

BACKGROUND OF RELATED ART 3-phase alternating current (AC) mains supply is typically used for distributing generated power to end consumers. In a 3-phase system, each AC supply is shifted by 120° ($2\pi/3$ radians) with respect to the other phases. One advantage of 3-phase power systems is the ease with which rotating machinery can generate the necessary phase-shifted AC currents.

An important requirement when loading a 3-phase circuit is that each phase is loaded equally; in other words, the loads on each of the 3 phases are roughly equivalent. When the loading on each phases is roughly equivalent, the loading is said to be balanced. Because the phase currents are 120° out of phase, the instantaneous sum of the currents for a balanced load is zero.

When the phase loading is balanced, system losses are reduced and lower rated conductors can be utilized. Unbalanced loads are also undesirable for generation. In a 3-phase generator, the phase windings are typically distributed around the stator, spaced apart by 120° ($2\pi/3$ radians). When phase loads are unbalanced (e.g., with phase currents varying more than 10%), rotor overheating may result in the generator. The rotor heating is caused by negative sequence currents in the field pole face.

Furthermore, when one of the phase windings is more heavily loaded than the others, the stator experiences a greater resistance to its rotation when inducing current into the heavily loaded winding as compared to a less heavily loaded winding. The differing loading on the stator results in mechanical vibration, stress, and accelerated wear and tear on the generator.

In addition to undesirable mechanical stresses, an unbalanced load can cause problems with automatic voltage regulation (AVR) circuitry. An AVR circuit regulates the output voltage of the phases at a desired level, for example 110 VAC or 230 VAC. When an unbalanced load is applied to a generator the AVR circuitry attempts to maintain the voltage on each phase at the desired level, however due to one phase being heavily loaded one phase may be disproportionally lower than the voltage on the other phases, this can result in instability of the AVR circuitry.

Unbalanced loads on a generator can cause load imbalance alarms and generator shut-down. Due to the issues caused by unbalanced loads, utility power providers can charge penalties to consumers of 3-phase power who do not balance their demand across all phases.

Typically, issues of unbalanced loads are avoided by consumers by ensuring that the loading on each phase is equal, usually by installing phase balancing circuitry. However, typical phase balancing circuitry is extremely expensive. Traditional phase balancing circuitry is not well suited to rapidly changing loads, such as when loads are spasmodic or unpredictable.

Examples of such loads include automated compressors or pumps as may be found in air-conditioning and refrigeration equipment.

Traditional phase load balancing systems utilize equipment that automatically switches AC loads from phase to phase to try to attain a balanced load. This generally involves switching equipment off momentarily as it transfers to a different phase, and the load steps are limited by the actual loads attached, and as such the balancing may be relatively coarse.

The most common technique for balancing loads is to simply distribute single-phase loads evenly across phases at the time of design. This does not, however, address the problem of single phase loads turning on and off.

It would be useful for a system to exist in which the individual loading can be varied dynamically to adjust for spasmodic or unpredictable loading.

It is an object of the present invention to address the foregoing problems or at least to provide the public with a useful choice.

All references, including any patents or patent applications, cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, such reference does not constitute an admission that any of these documents form part of the common general knowledge in the art, in New Zealand or in any other country.

Throughout this specification, the word “comprise”, or variations thereof such as “comprises” or “comprising”, will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1:
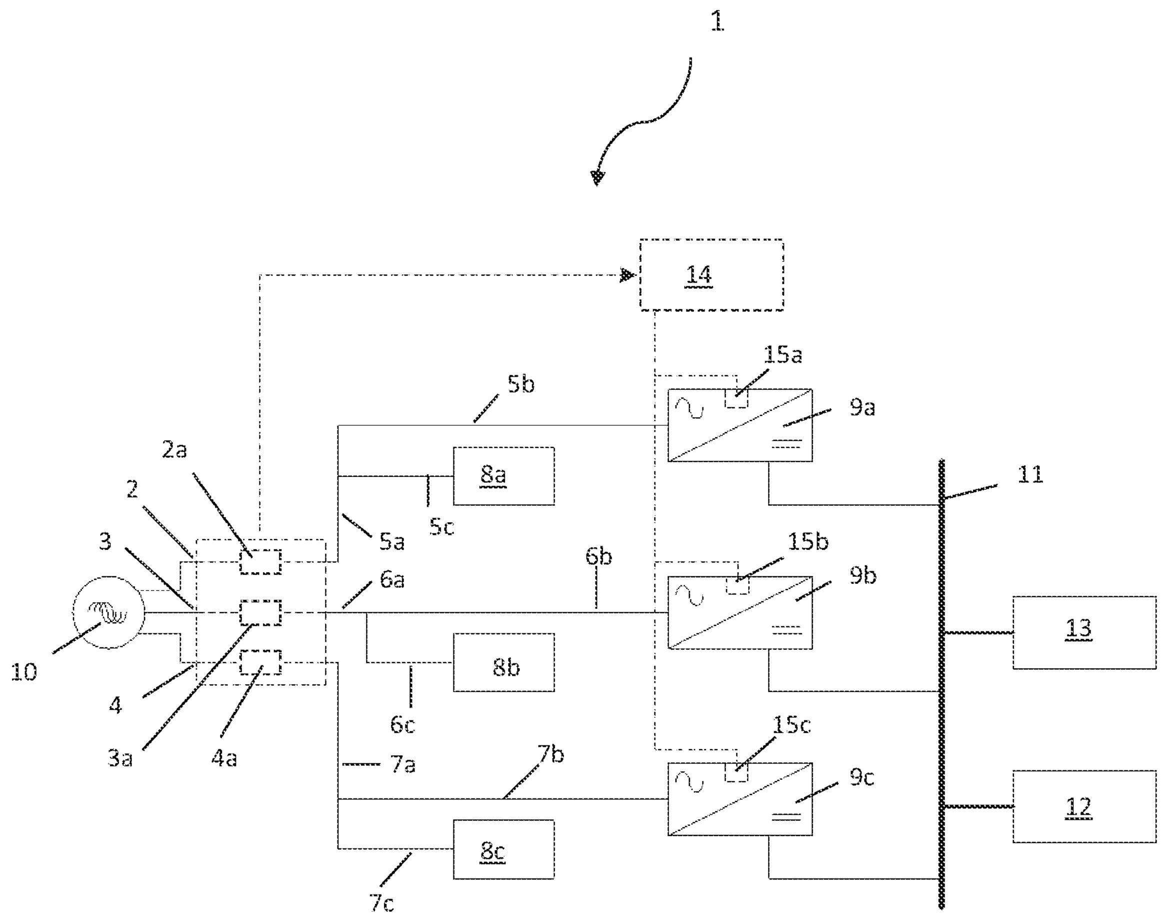
FIG. 1 shows a schematic view of a load balancing system in accordance with a preferred embodiment of the present invention.

The present invention relates to a load balancing system for balancing the current supplied on each phase of a multiple phase supply. The system includes an AC-DC converter on each phase, wherein the current drawn by each AC-DC converter can be varied, thereby providing a controllably variable current draw on each phase.

The load balancing system measures the current consumed from each phase of the multiple phase supply, monitors the power consumed by AC-DC converters, and adjusts the output current supplied by each of the AC-DC converters. For each phase, the phase current is equal to the sum of the current drawn by any AC fed equipment on that phase, plus the current drawn by the AC-DC converter on that phase. Adjustment of the AC-DC converters across all of the phases allows the phase currents to be adjusted to be substantially the same.

According to one aspect of the present invention there is provided a load balancing apparatus for providing a substantially balanced load on a 3-phase power supply, the apparatus including:

- a first AC input having an associated first input load sensing circuit, the first AC input having a current path to a first AC output and a first AC-DC converter feeding a first DC output;
- a second AC input having an associated second input load sensing circuit, the second AC input having a current path to a second AC output and a second AC-DC converter feeding a second DC output;
- a third AC input having an associated third input load sensing circuit, the third AC input having a current path to a third AC output and a third AC-DC converter feeding a third DC output; and
- a control circuit, wherein the control circuit is configured to dynamically adjust the power output from one or more of the first AC-DC converter, the second AC-DC converter and the third AC-DC converter to provide a balanced load on each of the first AC input, the second AC input and the third AC input.

In preferred embodiments the first AC-DC converter, second AC-DC converter and third AC-DC converter are configured to provide a variable DC output voltage.

In preferred embodiments at least two of the first AC-DC converter, the second AC-DC converter and the third AC-DC converter feed a common DC bus.

Preferably the common DC bus supplies a battery bank.

Preferably the control circuit dynamically varies the DC output voltage of one or more of the first AC-DC converter, the second AC-DC converter and/or the third AC-DC converter to vary the distribution of the load current supplied by from one or more of the AC-DC converters through the DC bus to the battery bank.

According to a second aspect of the present invention, there is provided a system for providing a substantially balanced load on a 3-phase power supply, the system including:

- at least one AC load;
- at least one DC load;
- a load balancing apparatus having a first AC input electrically connected to a first phase of the 3-phase power supply and having an associated first input load sensing circuit, the first AC input having a current path to a first AC output and a first AC-DC converter feeding a first DC output; a second AC input having an associated second input load sensing circuit, the second AC input having a current path to a second AC output and a second AC-DC converter feeding a second DC output; a third AC input having an associated third input load sensing circuit, the third AC input having a current path to a third AC output and a third AC-DC converter feeding a third DC output; and a control circuit, wherein the, or each, of the at least one AC load(s) is electrically connected to one or more of the first AC output, the second AC output, or the third AC output, wherein the at least one DC load is electrically connected to two or more of the first DC output, the second DC output and the third DC output, and wherein the control circuit is configured to dynamically adjust the current supplied from each of the DC outputs to the DC load so that the sum of the AC and DC loading on each AC input is substantially equal in magnitude.

According to a third aspect of the present invention, there is provided a method for balancing a 3-phase load using a phase balancing system, the phase balancing system including a first AC input having an associated first input load sensing circuit, the first AC input having a current path to a first AC output and a first DC output, a second AC input having an associated second input load sensing circuit, the second AC input having a current path to a second AC output and a second DC output, a third AC input having an associated third input load sensing circuit, the third AC input having a current path to a third AC output and a third DC output and a control circuit, the method including the steps of:

- a) inputting current from one of each phase of a 3-phase power supply to one each of the first AC input, the second AC input and the third AC input;
- b) supplying from the first AC input one, or both of, the first AC output and the first DC output;
- c) supplying from the second AC input one, or both of, the second AC output and the second DC output;
- d) supplying from the third AC input one, or both of, the third AC output and the third DC output;
- e) monitoring the loading on the first AC input by way of the first load sensing circuit;
- f) monitoring the loading on the second AC input by way of the second load sensing circuit;
- g) monitoring the loading on the third AC input by way of the third load sensing circuit; and
- h) adjusting the current output from one or more of the first DC output, the second DC output and the third DC output wherein the step of adjusting the current output results in the current drawn through each of the first AC input, the second AC input and the third AC input being substantially equivalent in magnitude.

With reference to FIG. 1, there is shown a schematic view of a load balancing system as generally indicated by designator 1. The load balancing system 1 includes a load balancing apparatus, as generally indicated by the components shown in dashed lines. The load balancing apparatus has a first AC input 2 having an associated first input load sensing circuit 2*a*, a second AC input 3 having an associated second input load sensing circuit 3*a* and a third AC input 4 having an associated third input load sensing circuit 4*a*. The AC inputs may take a number of forms; however, they will typically feature either hardwired connection to a mains feed 10 or connection by way of one or more plug and socket connectors. Plug and socket style connectors will be more commonly used in embodiments where the mains feed 10 is provided by a temporary supply such as a generator.

Current paths 5*a*-5*c*, 6*a*-6*c* and 7*a*-7*c* are provided from each of the AC inputs 2, 3, 4, through input load sensing circuits 2*a*, 3*a*, 4*a* to AC outputs 8*a*, 8*b*, 8*c* and to DC outputs 9*a*, 9*b*, 9*c*.

The current paths 5*a*-5*c*, 6*a*-6*c* and 7*a*-7*c* may be provided by way of separate cables or circuit board traces or they may be shared in part, as is shown, where both AC load and DC load current flows in sections 5*a*, 6*a* and 7*a*, AC load current flows in sections 5*c*, 6*c* and 7*c*, and DC load current flows in sections 5*b*, 6*b* and 7*b*.

Although shown as a single circuit block, AC loads 8*a*, 8*b*, 8*c* could take any number of forms. For example, each of blocks 8 *a*, 8 *b*, 8 *c* may comprise a single AC powered piece of equipment or a number of separate pieces of equipment. AC loads 8 *a*, 8 *b*, 8 *c* will generally include appliances and equipment that would typically be supplied from the AC mains feed and will also include the standard power outlets and light fittings if the load balancing system is installed in a building. The number of devices supplied by each phase may vary; however, fixed plant and outlets will typically be distributed evenly across each phase to provide a roughly balanced load on each phase under ideal load conditions.

The AC current paths 5*b*, 6*b*, and 7*b* provide current to AC-DC converters 9*a*, 9*b*, 9*c*. The outputs of the AC-DC converters 9*a*, 9*b*, 9*c* each feed a DC bus 11. The DC bus voltage may vary and is not pertinent to the invention.

The DC bus 11 supplies current to a battery bank 12 and a DC load 13. The DC load 13 may vary depending on the type of installation and may include DC powered telecommunications equipment, server banks, lighting, or the like. In some embodiments, the DC load may include one or more inverters configured to provide AC power.

In some embodiments, the AC-DC converters 9*a*, 9*b* and 9*c* may be capable of dual mode operation, whereby they can function as both a rectifier and an inverter. Alternatively, separate rectifier and inverter modules may be provided in a parallel arrangement. Where an inverter function is provided, current can be drawn from the DC bus and fed onto one or more of the AC phases. In such embodiments, current can be drawn from the battery bank and one or more of the phases to be supplied to the other phases.

A control circuit 14 monitors the input load sensing circuits 2*a*, 3*a*, 4*a* and transmits control signals to control circuitry 15*a*, 15*b*, 15*c* one each of which is associated with one of the AC-DC converters 9*a*, 9*b*, 9*c*. Upon receiving a control signal transmitted by the control circuit 14, the control circuitry 15*a*, 15*b*, 15*c* acts to adjust the amount of current supplied by its associated AC-DC converter 9*a*, 9*b*, 9*c* onto the DC bus 11.

In some embodiments the control circuitry may control its associated AC/DC converter 9*a*, 9*b*, 9*c* to switch from a rectification mode to an inverter mode, whereby current is drawn from the DC bus and fed to the AC load sharing the same phase.

With reference now to FIGS. 1 to 4, the load balancing system 1 will be described by way of an example.

Figure 2A:
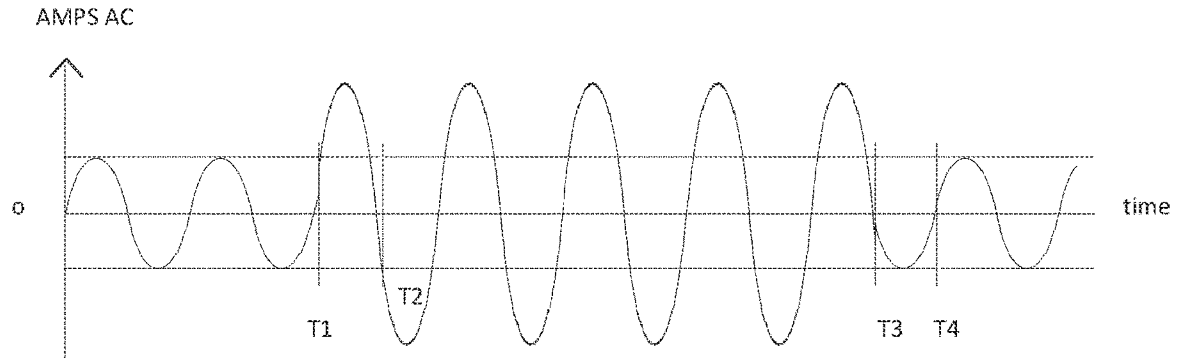
FIG. 2*a* shows a current vs time graph for an AC load supplied from a first phase.
Figure 2B:
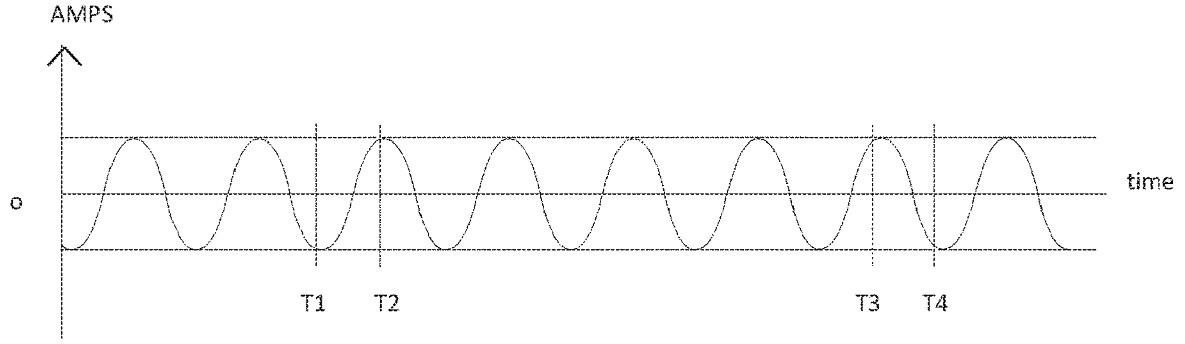
FIG. 2*b* shows a current vs time graph for an AC load supplied from a second phase.
Figure 2C:
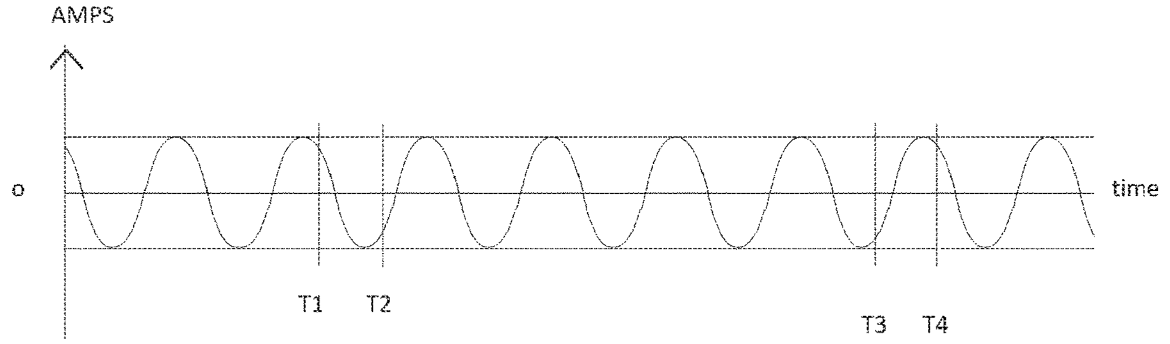
FIG. 2*c* shows a current vs time graph for an AC load supplied from a third phase.

FIGS. 2*a*-2*c* are current vs time graphs. FIG. 2*a* depicts the AC load current on phase 1 drawn by the AC load 8*a*. Phase 1 AC load 8*a* includes steady plant having a continuous fixed draw as well as an air-conditioning unit having a compressor which sporadically turns on. In FIG. 2*a*, the compressor turns on at time T1 and turns off at time T3, as is indicated by the increased current consumption between the points T1 and T3.

FIG. 2*b* is the AC load current on phase 2 drawn by AC load 8*b*, and FIG. 2*c* is the AC load current on phase 3 drawn by AC load 8*c*. For the purposes of this example, the AC load current on each of phase 2 and phase 3 is a continuous fixed draw, as is shown by the steady current draw in each of FIGS. 2*b* and 2*c*.

Figure 3A:
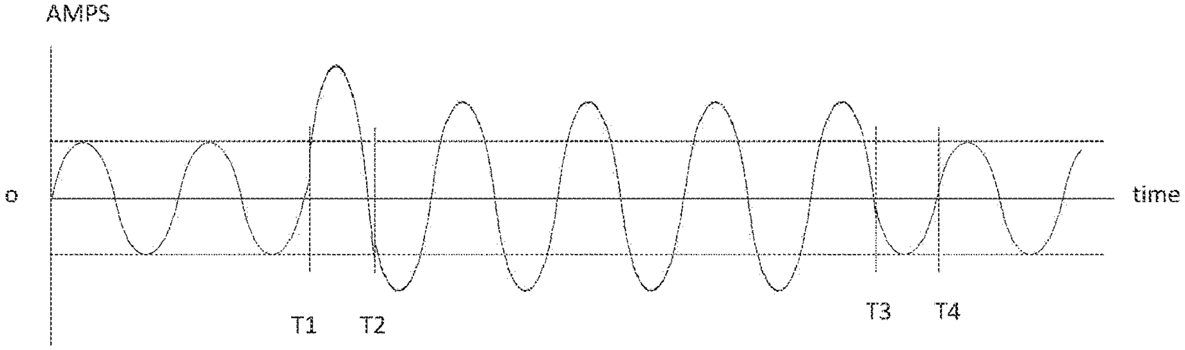
FIG. 3*a* shows a current vs time graph of the total current supplied to a first phase.
Figure 3B:
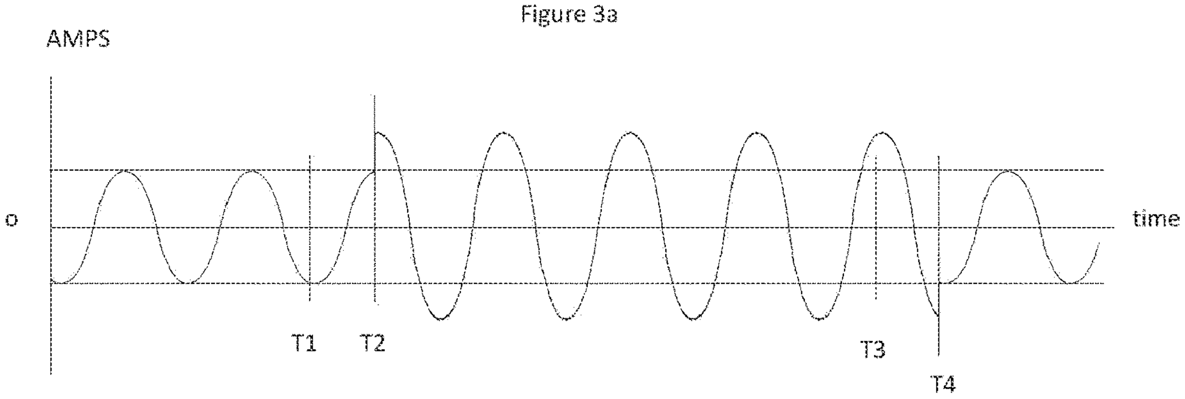
FIG. 3*b* shows a current vs time graph of the total current supplied to a second phase.
Figure 3C:
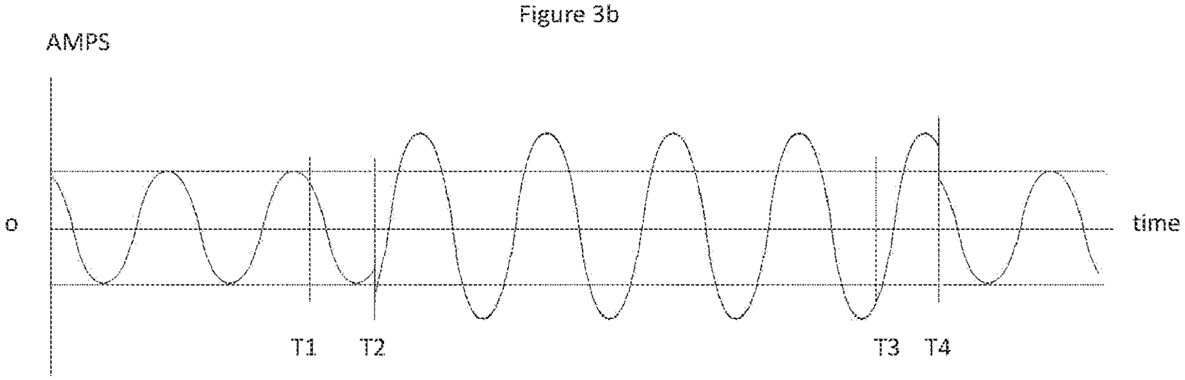
FIG. 3*c* shows a current vs time graph of the total current supplied to a third phase.

FIGS. 3*a*-3*c* are also current vs time graphs. FIG. 3*a* illustrates the current waveform measured at load sensing circuit 2*a* and is indicative of the combined current consumed by both the AC load 8*a* and the loading of the AC-DC converter 9*a* on phase 1. FIG. 3*b* illustrates the current waveform measured at load sensing circuit 3*a* and is indicative of the combined current consumed by both the AC load 8*b* and the loading of the AC-DC converter 9*b* on phase 2. FIG. 3*c* illustrates the current waveform measured at load sensing circuit 4*a* and is indicative of the combined current consumed by both the AC load 8*c* and the loading of the AC-DC converter 9*c* on phase 3.

Figure 4A:
FIG. 4*a* shows a current vs time graph for a DC load supplied from a first phase.
Figure 4B:
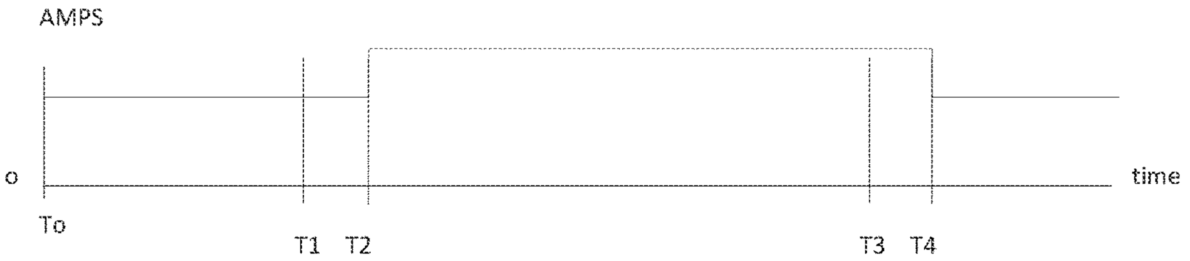
FIG. 4*b* shows a current vs time graph for a DC load supplied from a second phase.
Figure 4C:
FIG. 4*c* shows a current vs time graph for a DC load supplied from a third phase.

FIGS. 4*a*-4*c* are DC current vs time graphs. FIG. 4*a* depicts the DC load current on phase 1, FIG. 4*b* depicts the DC load current on phase 2, and FIG. 4*c* depicts the DC load current on phase 3.

For the purposes of this example, the AC-DC converters 9*a*, 9*b*, and 9*c* each feed DC bus 11. The DC bus 11 supplies current to a battery bank 12 and a DC load 13 which is in the form of fixed telecommunications equipment. For simplicity, the current drawn by the fixed telecommunications equipment is constant and the current drawn by the battery bank is proportional to the DC bus voltage. The battery can be used as both a current sink and a current source. For example, increasing the DC output voltage of the AC-DC converters to a voltage greater than the battery bank's terminal voltage causes an increasing current to flow into the battery bank, and reducing the DC output voltage of the AC-DC converters to a voltage below the terminal voltage of the battery bank causes current to flow out of the battery bank.

The current supplied from each over the AC-DC converters is regulated by varying the DC output voltages.

The period of time between T1 and T2, and T3 and T4 correspond to the finite time taken for the control circuit 14 to detect a current imbalance between the phases, to transmit control signals to the control circuitry, and for the AC-DC converters to adjust their outputs accordingly.

It should be appreciated that this time period will vary between embodiments. The delay illustrated in FIGS. 2*a*-2*c*, 3*a*-3*c*, and 4*a*-4*c* has been exaggerated to illustrate the operation of the present invention and is in no way indicative of the length of delay that will be present in preferred embodiments of the present invention.

The period between T1-T2 and T3-T4 is the period during which the phases are being balanced. In preferred embodiments, the load balancing system dynamically balances the phases sufficiently quickly for there to be substantially no period in which there are unbalanced phase currents. It should be appreciated that in practical realizations, the times T1-T2 and T3-T4 may vary from a few seconds to a number of minutes.

The sequence of events detailed in the example shown in FIGS. 2*a*-2*c*, 3*a*-3*c* and 4*a*-4*c* commences with the system operating in a steady state, this is the period between T0 and T1. During the T0 to T1 period, the AC and DC loads 8*a*, 8*b*, 8*c* on each phase are substantially balanced. It should be appreciated that the AC and DC currents shown in FIGS. 3*a*-3*c* and 4*a*-4*c* have been chosen to be the same solely for clarity, and the actual AC load currents may vary between phases, in which case the DC load currents will also vary in order for the sum of the AC and DC currents to be same on each phase.

During the period between T1 and T3, the air-conditioning unit on phase 1 switches on and the AC load current increases, as is shown in FIG. 2*a*. The control circuit 14 detects the current through phase 1 input load sensing circuit 2*a* as being greater than the current though phase 2 and phase 3 input load sensing circuits 3*a* and 4*a*. The controller transmits control signals to:

a) control circuitry 15*a* instructing phase 1 AC-DC converter 9*a* to reduce its supply of current to DC bus 11, the decreasing current occurs at T2 in FIG. 4*a;* b) control circuitry 15*b* instructing phase 2 AC-DC converter 9*b* to increase its supply of current to DC bus 11, the increase in current occurs at T2 in FIG. 4*b*; and c) control circuitry 15*c* instructing phase 3 AC-DC converter 9*c* to increase its supply of current to DC bus 11, the increase in current occurs at T2 in FIG. 4*c*.

It should be appreciated that although FIGS. 4*a*, 4*b* and 4*c* illustrate ideal waveforms showing a step change in current, real-world embodiments may exhibit a smoother transition such as ramping or the like.

In FIGS. 3*a* to 3*c*, the period of time between T2 and T3 represents the period of time that the compressor is running on phase 1 and the load balancing system 1 is controlling the current supplied by the AC-DC converters 9*a*, 9*b*, 9*c* to balance the phase currents. During this period, the sum of the AC and DC load currents on each phase are substantially the same. The control circuit 14 measures the current through the phase 1, phase 2 and phase 3 input load sensing circuits 2*a*, 3*a*, and 4*a* as being substantially the same.

In FIG. 2*a*, the current drops back to its steady state value at time T3. This corresponds to the time when the compressor on phase 1 turns off.

During the period of time between T3 and T4 the control circuit 14 detects the current through phase 1 input load sensing circuit 2*a* as being less than the current though phase 2 and phase 3 input load sensing circuits 3*a* and 4*a*. The controller transmits control signals to:

a) control circuitry 15*a* instructing phase 1 AC-DC converter 9*a* to increase its supply of current to DC bus 11, the increasing current occurs at T4 in FIG. 4*a;* b) control circuitry 15*b* instructing phase 2 AC-DC converter 9*b* to decrease its supply of current to DC bus 11, the decrease in current occurs at T4 in FIG. 4*b*; and c) control circuitry 15*c* instructing phase 3 AC-DC converter 9*c* to decrease its supply of current to DC bus 11, the decrease in current occurs at T4 in FIG. 4*c*.

Typically, the combination of the DC load and the maximum charging rate of the battery bank are configured to provide a peak rate at which current can be supplied by the AC-DC converters. This peak rate is configured to be substantially equivalent to, or greater than, the highest sporadic AC load that might draw current on one of the phases. In embodiments that provide an inverter function current can be drawn from phases that have a low AC load to supply current to phases that have a high AC load, thereby providing load sharing between phases.

The AC-DC converters 9*a*, 9*b*, 9*c* may be either single modules or multiple modules in parallel, or complete 3-phase modules that have the ability to control individual phase input currents. A modular system allows scalability to be provided to the system whereby additional modules can be added if larger phase imbalances need to be catered for. In some installations numerous individual load balancing system may be provided which are spread across a single site that is fed by a single 3-phase supply. In such embodiments the individual load balancing systems may monitor a single set of input load sensing circuits 2*a*, 3*a*, 4*a* associated with the single 3 phase supply, or alternatively each load balancing system may monitor its own set of input load sensing circuits 2*a*, 3*a*, 4*a*. If each load balancing system balances its own current demand on each phase the combined loading of the individual load balancing systems will also be balanced. In some embodiments the individual load balancing systems may be configured to communicate with one another to act in unison to equalize the phase loading in either a collaborative manner or as individuals.

Unless the context clearly requires otherwise, throughout the description and the claims, the words “comprise”, “comprising”, and the like, are to be construed in an inclusive sense as opposed to an exclusive or exhaustive sense, that is to say, in the sense of “including, but not limited to”.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavor in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention as claimed in the appended claims, and without diminishing its attendant advantages. It is therefore intended that such changes and modifications be included within the present invention.

What is claimed is:

1. A load balancing apparatus for providing a substantially balanced load on a 3-phase power supply, the load balancing apparatus comprising:

a first AC input having coupled thereto a first AC input load sensing circuit, the first AC input having a first AC input current path extending through the first AC input load sensing circuit to a first AC output and a first AC-DC converter feeding a first DC output, and the first AC input being configured to directly connect to a first phase of the 3-phase power supply;

a second AC input having coupled thereto a second AC input load sensing circuit, the second AC input having a second AC input current path extending through the second AC input load sensing circuit to a second AC output and a second AC-DC converter feeding a second DC output, and the second AC input being configured to directly connect to a second phase of the 3-phase power supply;

a third AC input having coupled thereto a third AC input load sensing circuit, the third AC input having a third AC input current path extending through the third AC input load sensing circuit to a third AC output and a third AC-DC converter feeding a third DC output, and the third AC input being configured to directly connect to a third phase of the 3-phase power supply; and a control circuit configured to monitor the first AC input load sensing circuit, the second AC input load sensing circuit, and the third AC input load sensing circuit, and configured to dynamically adjust the power output from one or more of the first AC-DC converter, the second AC-DC converter, or the third AC-DC converter to provide a balanced load on each of the first AC input, the second AC input, and the third AC input, wherein the control circuit dynamically varies the DC output voltage of one or more of the first AC-DC converter, the second AC-DC converter, or the third AC-DC converter to vary a distribution of load current supplied by one or more of the first to third AC-DC converters.

2. The load balancing apparatus as claimed in claim 1, wherein at least two of the first AC-DC converter, the second AC-DC converter, or the third AC-DC converter feed a common DC bus.

3. The load balancing apparatus as claimed in claim 2, wherein the common DC bus supplies a battery bank.

4. The load balancing apparatus as claimed in claim 1, wherein the load balancing apparatus is configured to be electrically connected between a 3-phase utility feed to a premises and at least a portion of an electrical load presented by the premises.

5. The load balancing apparatus as claimed in claim 1, wherein the load balancing apparatus is configured to be electrically connected between a 3-phase feed and a load comprising at least one of an AC component or a DC component.

6. The load balancing apparatus as claimed in claim 1, wherein at least one of the first AC input load sensing circuit, the second AC input load sensing circuit, or the third AC input load sensing circuit includes at least one current transformer coupled to the first AC input current path, the second AC input current path, or the third AC input current path, respectively.

7. The load balancing apparatus as claimed in claim 1, wherein each of the first AC-DC converter, the second AC-DC converter, or the third AC-DC converter is configured to provide a variable DC output voltage.

8. The load balancing apparatus as claimed in claim 1, wherein the DC output voltage of one or more of the first AC-DC converter, the second AC-DC converter, or the third AC-DC converter is coupled to a battery bank.

9. A method for balancing a 3-phase electrical load, the method comprising:

supplying current from a first phase of a 3-phase power supply to a first AC input having coupled thereto a first input load sensing circuit, the first AC input having a first AC input current path extending through the first AC input load sensing circuit to a first AC output and a first AC-DC converter feeding a first DC output, and the first AC input being configured to directly connect to a first phase of the 3-phase power supply;

supplying current from a second phase of the 3-phase power supply to a second AC input having coupled thereto a second input load sensing circuit, the second AC input having a second AC input current path extending through the second AC input load sensing circuit to a second AC output and a second AC-DC converter feeding a second DC output, and the second AC input being configured to directly connect to a second phase of the 3-phase power supply;

supplying current from a third phase of the 3-phase power supply to a third AC input having coupled thereto a third input load sensing circuit, the third AC input having a third AC input current path extending through the third AC input load sensing circuit to a third AC output and a third AC-DC converter feeding a third DC output, and the third AC input being configured to directly connect to a third phase of the 3-phase power supply:

monitoring the first AC input load sensing circuit, the second AC input load sensing circuit, and the third AC input load sensing circuit; and dynamically adjusting, by a control circuit, DC output voltage of one or more of the first AC-DC converter, the second AC-DC converter, or the third AC-DC converter to cause current drawn through each of the first AC input, the second AC input, and the third AC input to be substantially equal.

10. The method of claim 9, wherein at least one of the first AC input load sensing circuit, the second AC input load sensing circuit, or the third AC input load sensing circuit includes at least one current transformer coupled to the first AC input current path, the second AC input current path, or the third AC input current path, respectively.

11. The method of claim 9, wherein the dynamic adjustment by the control circuit of current output comprises dynamically varying DC output voltage of one or more of the first AC-DC converter, the second AC-DC converter, or the third AC-DC converter.

12. The method of claim 9, further comprising feeding a common DC bus with at least two of the first AC-DC converter, the second AC-DC converter, or the third AC-DC converter.

13. The method of claim 12, further comprising supplying a battery bank with the common DC bus.

14. The method of claim 9, wherein the 3-phase power supply comprises a 3-phase utility feed to a premises, and the 3-phase electrical load comprises at least a portion of an electrical load presented by the premises.

15. A battery charging apparatus for providing a substantially balanced load on a 3-phase power supply and for charging a plurality of batteries, the battery charging apparatus comprising:

a first AC input having coupled thereto a first input load sensing circuit, the first AC input having a first AC input current path extending through the first AC input load sensing circuit to a first AC output and a first AC-DC converter feeding a first DC output, and the first AC input being configured to directly connect to a first phase of the 3-phase power supply:

a second AC input having coupled thereto a second input load sensing circuit, the second AC input having a second AC input current path extending through the first AC input load sensing circuit to a second AC output and a second AC-DC converter feeding a second DC output, and the second AC input being configured to directly connect to a second phase of the 3-phase power supply:

a third AC input having coupled thereto a third input load sensing circuit, the third AC input having a third AC input current path extending through the first AC input load sensing circuit to a third AC output and a third AC-DC converter feeding a third DC output, and the third AC input being configured to directly connect to a third phase of the 3-phase power supply; and a control circuit configured to monitor the first AC load sensing circuit, the second AC load sensing circuit, and the third AC load sensing circuit, and configured to dynamically adjust the power output from one or more of the first AC-DC converter, the second AC-DC converter, or the third AC-DC converter to provide a balanced load on each of the first AC input, the second AC input, and the third AC input, wherein at least two of the first AC-DC converter, the second AC-DC converter, or the third AC-DC converter feed a common DC bus supplying a battery bank comprising a plurality of batteries, and wherein the control circuit dynamically varies the DC output voltage of one or more of the first AC-DC converter, the second AC-DC converter, or the third AC-DC converter to vary a distribution of load current supplied by one or more of the first to third AC-DC converters through the common DC bus to the battery bank.

16. The battery charging apparatus as claimed in claim 15, wherein at least one of the first AC input load sensing circuit, the second AC input load sensing circuit, or the third AC input load sensing circuit includes current transformers coupled to the first AC input current path, the second AC input current path, or the third AC input current path, respectively.

17. The battery charging apparatus as claimed in claim 15 wherein the apparatus is configured to be electrically connected between a 3-phase utility feed to a premises and the battery bank.

18. The battery charging apparatus as claimed in claim 15, wherein each of the first AC-DC converter, the second AC-DC converter, or the third AC-DC converter is configured to provide a variable DC output voltage.

* * * * *